United States Patent
Nguyen et al.

(10) Patent No.: US 11,526,813 B2
(45) Date of Patent: Dec. 13, 2022

(54) METHOD OF AUTOMATIC IDENTIFICATION OF FLYING TARGETS BY MOTION, TIME, AND 3/A CODE INFORMATION

(71) Applicant: ViETTEL GROUP, Ha Noi (VN)

(72) Inventors: Anh Tuan Nguyen, Ha Noi (VN);
Quang Bang Nguyen, Ha Noi (VN);
Thanh Binh Nguyen, Ha Noi (VN)

(73) Assignee: VIETTEL GROUP, Ha Noi (VN)

( * ) Notice: Subject to any disclaimer, the term of this patent is extended or adjusted under 35 U.S.C. 154(b) by 493 days.

(21) Appl. No.: 16/668,777

(22) Filed: Oct. 30, 2019

(65) Prior Publication Data

US 2020/0175425 A1 Jun. 4, 2020

(30) Foreign Application Priority Data

Nov. 29, 2018 (VN) ............................. 1-2018-05353

(51) Int. Cl.
*G06N 20/20* (2019.01)

(52) U.S. Cl.
CPC ................................. *G06N 20/20* (2019.01)

(58) Field of Classification Search
None
See application file for complete search history.

(56) References Cited

U.S. PATENT DOCUMENTS

| | | | | |
|---|---|---|---|---|
| 7,719,461 | B1 * | 5/2010 | Mookerjee | G01S 7/003 342/135 |
| 8,639,476 | B2 * | 1/2014 | Martell | F41H 11/02 702/196 |
| 2010/0148977 | A1 * | 6/2010 | Tseng | G08G 1/166 340/686.1 |
| 2016/0103214 | A1 * | 4/2016 | Clark | G01S 13/723 342/59 |
| 2016/0299223 | A1 * | 10/2016 | Testa | G01S 3/02 |
| 2016/0363660 | A1 * | 12/2016 | Gudim | G01S 13/66 |

FOREIGN PATENT DOCUMENTS

| | | | | |
|---|---|---|---|---|
| CN | 111225189 | A * | 6/2020 | |
| CN | 111256697 | A * | 6/2020 | |
| CN | 111898746 | A * | 11/2020 | |
| CN | 112198870 | A * | 1/2021 | |
| CN | 112327903 | A * | 2/2021 | ............ G05D 1/101 |
| CN | 112445238 | A * | 3/2021 | ............ G05D 1/101 |
| RU | 2695019 | C1 * | 7/2019 | |

* cited by examiner

*Primary Examiner* — Abdhesh K Jha
(74) *Attorney, Agent, or Firm* — PatentTm.US

(57) ABSTRACT

Embodiments of the present invention proposes a method to automatically identify the flying targets by physical information (coordinates, heading, speed), time, and identification information (3/A code). This method includes two steps: features extraction and building machine learning model. In the features extraction step, features which are extracted include: cell indexes corresponding to coordinates, information of flight path, time in day/night format, heading, speed, and 3/A code, constructing n-dimensional vector. This vector is used as input for training a Random Forest model, to automatically identify class label of flying targets.

4 Claims, 2 Drawing Sheets

Model training

Model application

[ f1, f2, f3, f4, ..., f80, f81, f82, f83, f84]

Model training

Model application

METHOD OF AUTOMATIC IDENTIFICATION OF FLYING TARGETS BY MOTION, TIME, AND 3/A CODE INFORMATION

TECHNICAL ASPECTS OF THE INVENTION

The invention describes the method of automatic identification of flying targets. This method uses physical motion information, time, 3/A code, and can be applied in tracking systems in satellite, navigation, transportation, and military.

BACKGROUND OF THE INVENTION

In military, target identification is often conducted manually and based on personal experience. There are some proposed methods to identify the flying objects in the world, however, there still remained certain drawbacks. Those methods require specifying some basic attributes such as flight path of the target. The simplest way to identify the flight path of a flying target is to calculate the distance from the target to all available flight paths and choose the nearest one.

However, this method is expensive in computation due to the orthographic projection calculations. It also requires searching for the nearest flight path whenever the coordinates of flying target are updated. Moreover, when the target is near the airport or the intersection point of flight paths, it is not certain that the nearest flight path is the one that target follows.

Artificial Intelligence approaches such as Decision Tree method are also widely applied in object identification. However, as Decision tree is sensitive with data, if there is a change in training data, the output made by the decision trees then will be totally different from the previous one.

In order to handle these above problems, we propose a new method which could automatically identify flying targets based on the features of motion information, time, and 3/A code. This proposed method with automatic identification ability will optimize the process of target identification, reduce the human errors, and improve the accuracy of results.

SUMMARY OF THE INVENTION

The purpose of the invention is to propose a method to automatically identify a flying target based on its information of motion, time and 3/A code. This method is used to classify and label the targets corresponding with their activities including: Military/Domestic/Transit/International. The invention applies Random Forest technique with flying target's feature information of longitude, latitude, heading, speed, time, and 3/A code. From the feature space of flying target built from physical information (longitude, latitude, heading, and speed), time, and identification information (3/A code), the invention will construct a random forest containing multiple decision trees.

The proposed invention includes 2 basic steps:
Step 1: Feature Extraction: In this step, construct feature space from input data. The novelty of this step is:
This feature extraction step contain these sub steps:
Discretizing coordinates in longitude-latitude grid by constructing discretized longitude latitude grid, then map the coordinates of the target to index by replacing the flying target's coordinates with the cell's index that the target belongs to.

Extracting information of flight path by supplement information of other flight paths that intersect with each square in the discretized longitude-latitude grid. The squares that contain coordinates of the target will represent this target's flight path. Encode the flight path information into numeric form by binary encoder.

Extracting time information by converting time format from hour/minute/second to day/night format, in which, day represents the time span from 6 am to 6 pm and night applies for that from 6 pm to 6 am. We also use a binary encoder to assign day to 1 and night to 0;

The remaining information (heading, speed, 3/A code) is used as feature in the raw form.

Step 2: Voting decision trees.
Each Decision tree in the random forest will vote for one identification based on those above extracted features applied to the decision tree. We synthesize the results and choose the identification that got the majority voting.

DETAILED DESCRIPTION OF THE PREFERRED EMBODIMENT

This part describes in detail the method to automatically identify the flying target based on its information of motion, time and 3/A code through example, figure, and explanation.

In this invention, we explain those terms as below:

Identification information or 3/A code: is 4-digit code which is assigned for each flying target based on the convention of aviation to distinguish among the flying targets.

Decision tree: is a prediction model that maps the observations to the conclusion of target values of those observations. Each decision tree with input data will give a label of identification. The most voted identification label will be chosen to be the label of the target.

Identification label includes: Military (flying targets being planes which belong to Ministry of Defense to perform mission), Domestic (flying targets being planes with domestic flight route), Transit (flying targets being foreign planes transiting in current's country airspace), International (flying targets being planes with flight route between domestic airport and foreign airport).

Figure 4:
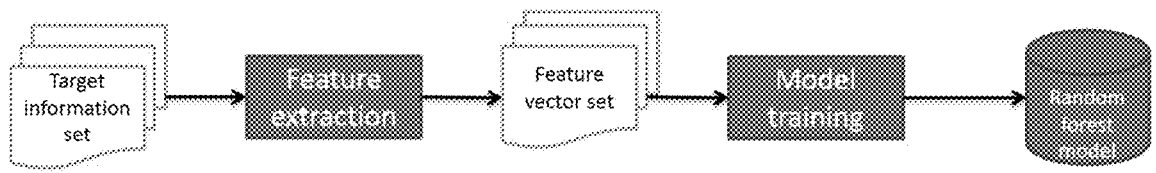
FIG. 4 is a diagram demonstrating the overview of the training and application phases of the model.
Figure 4:
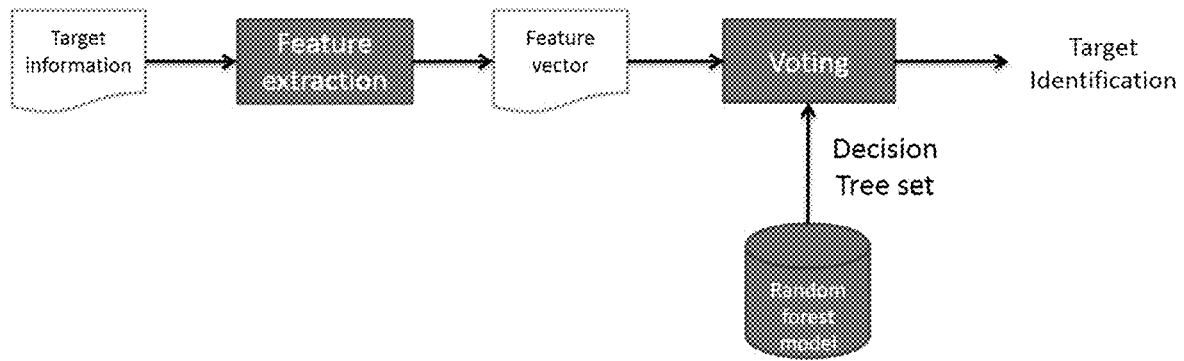

As can be seen in FIG. 4, the invention contains 2 basic steps:

Step 1: Feature Extraction
This step is performed to construct feature spaces from input data.

The original input data of the flying target include: coordinates, heading, speed, time, and 3/A code (those information are only at an exact time). These information are too detailed, hence not suitable for being the feature of the data. As such, we need to generalize these information through the feature extraction process.

Figure 1:
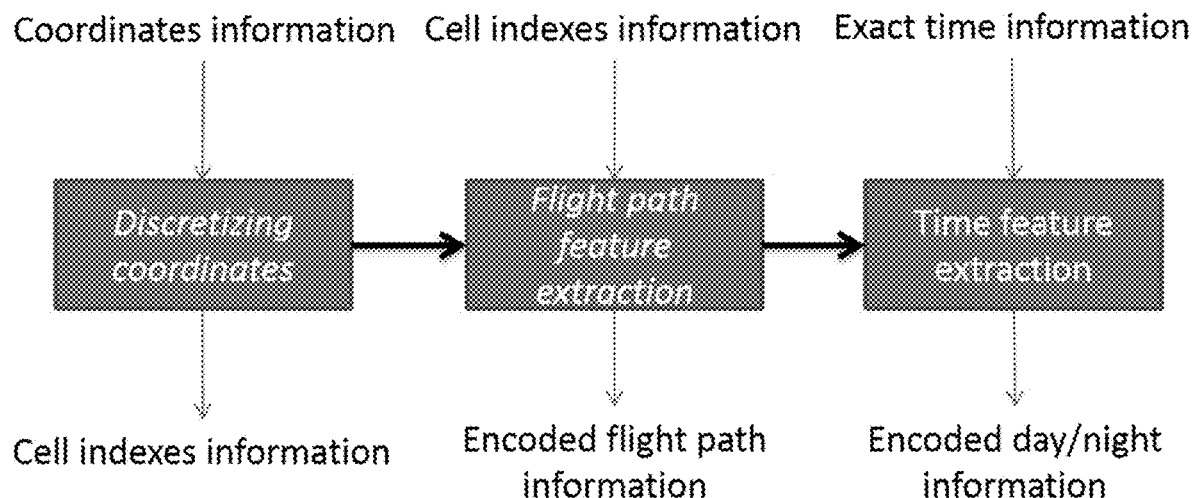
FIG. 1 is a block diagram explaining feature extraction process of flying target.

With the reference to the FIG. 1, which describes the diagram of extracting features. Features extraction process includes minor steps below:

Discretizing the coordinates information: coordinates of flying target are too accurate, hence they will cause overfitting problem when being applied to the model. To handle this problem, the invention is proposed to discretize those information in longitude-latitude grid. Discretization method is explained as below:

Constructing the discretized longitude-latitude grid including the cell with longitude width $\Delta\rho$ and latitude width $\Delta\theta$. Those values of width are adjustable.

In an aspect of the implementation of the invention, the value of latitude width $\Delta\theta=0.5°$ and longitude width $\Delta\rho=0.5°$ give the best result.

The coordinates of the flying target will be replaced with cell indexes that the plane belongs, which means we map the plane's coordinates to the cell indexes.

In an aspect of the implementation of the invention, if the coordinates of the flying targets are 102°12'50"(102,2138°) and 21°48'34"(21,8094°), the flying target will locate in cell (204, 43).

Figure 2:
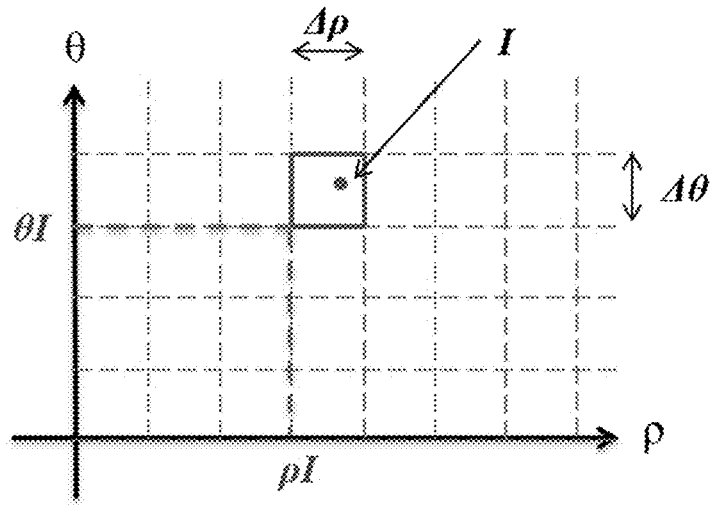
FIG. 2 is a diagram describing coordinates discretization method in longitude-latitude grid.

With reference to FIG. 2 describing the discretized latitude-longitude grid, the result when mapping the flying target's coordinates to cell indexes is:

102,2138/0,5=204,427621,8094/0,5=43,6188

Extracting flight path information: Flight path is also a good feature reflecting the characteristic of the flying target. The identification labels of flying targets correlate with characteristics of those flight paths.

For instance:

Domestic flights must operate along the flight paths between domestic airports;

International flights must operate along the flight paths which cross the country;

Transit flights must operate along the flight paths which connect domestic airports and foreign airports.

However, as mentioned from above, the method determining the optimal flight path from the set of many available flight paths has a drawback regarding to the expensive cost of computation due to the orthographic projection calculations. To solve this problem, the invention suggests the method to extract information from the flight path as below:

Supplementing the information of the flight path crossing each cell in the discretized latitude-longitude grid. For example, if cell (0, 0) has 3 flight paths A, B, C cross it, the flight path information of cell (0, 0) is (A, B, C)

Determining the flight path of the flying target as the flight path of the cell where the coordinates of the flying targets belong to. This proposed method reduces the cost of computation significantly, as we have already constructed the flight path information of the cells, thus there is no need to recalculate the flight path when the flying target's coordinates change. Additionally, each cell contains information of multiple flight paths, which allows assigning flying targets to a set of flight paths instead of only single one.

The information of flight paths are stored in text format, thus we need to convert them into numeric format as below:

Each flight path is assigned to a dimension of feature space, it is encoded by binary method with two values 0 and 1. To be specific:

If the flying target does not follow a particular flight path, this one is encoded as 0;

If the flying target follows a particular flight path, this one is encoded as 1.

For example:

If we have totally three available flight paths: A, B, and C, hence the feature space will has three dimensions. If the flying target is a plane following A path, it's feature will be encoded as (1,0,0), similarly, B and C one will be encoded as (0,1,0) and (0,0,1) and (1,1,1) for the whole three paths.

In an aspect of the implementation of the invention applied in Vietnam, there are 78 flight paths, hence flight path information for each plane flying target will be encoded in 78 dimensions of the feature space.

Extracting time information: Similar to the location information, time information of flying target in each coordinate point is too detailed, which is not suitable for training phase of the model. The invention hence proposes converting the time format from hour/minute/second format to day/night one, in which, day is assigned for time range from 6 am to 6 pm, and night is assigned for time range from 6 pm to 6 am. Day value is then be encoded as 1, while night value is encoded as 0.

This method is extremely good at reflecting the characteristics of Military and Domestic flights, which tend to operate in daytime.

The remaining information (heading, speed, 3/A code) are used directly to as input features.

Figure 3:
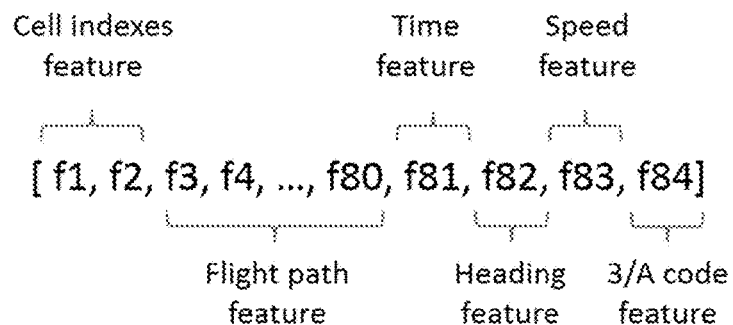
FIG. 3 is an illustration of feature vector representing dimensions of feature space.

In an aspect of the implementation of the invention, with reference to FIG. 3, after feature extraction step, features extracted include cell indexes, flight path, day/ night flight, heading, speed, and 3/A code. We combine them to construct a 84-dimensional vector, which contains: 2 dimensions for discretized longitude-latitude cell indexes, 78 dimensions for encoded flight paths, 1 dimension for encoded timing day/night, 2 dimensions for heading and speed, and the last one for 3/A code.

Step 2: Voting for identification

After extracting features, the next step is to build a machine learning model to automatically identify the class label of the flying targets. The set of class labels includes: Military, Domestic, Transit and International.

The main technique of the invention is Random Forest technique, which is a machine learning based method, building ensemble decision trees. Decision tree is also a machine learning based method, which can be described as below:

The data set is initialized from the root node

Decision is made based on the tree traversal from root to leaves.

Each internal node of tree corresponds to an attribute.

Branches representing the output of decision or the subsets of data are split correspondingly with the parent node.

Each leaf node corresponds to a Class Label

Detailed steps of building a decision tree are described as below:

Building tree:

Initially, all data representing the set of observation start from the root;

Split the dataset into subsets which corresponds to values of attributes.

Branch pruning:

Identify and remove branches whose data are noises or irrelevant.

Classification:

Traverse through output decision corresponding to attribute value from internal nodes of the tree until we reach a leaf node to decide the final class label.

Random Forest technique is proposed in this invention to reduce the variances for decision tree technique. Random Forest uses a combination of decision trees instead of only single one to improve the stability and accuracy of the classification result.

In an aspect of the implementation of the invention, the 84-dimension vectors which were extracted from step 1 will be the input for training the Random Forest model.

Given the training dataset S of size n, the training phase of Random Forest is conducted as below:

Split dataset S into m subsets Si, i=1, . . . m, each subset has the size of n', by sampling from S uniformly and with replacement. Sampling with replacement is a technique allowing some examples from original set S to be repeated in subsets Si.

If n=n', then for large n the set Si is expected to have the fraction $(1-1/e) \approx 63.2\%$ of the unique examples of S, the rest will be duplicated.

The detail of the training phase is explained as below:
- Generating randomly subsets Si from original dataset S by sampling with replacement;
- Training those subsets with decision tree model;
- Calculating the average prediction result for each new subset.

When determining the best features for splitting data at the nodes of decision trees, we only choose m features among the total of M features, regularly $m=\sqrt{M}$. In an aspect of the implementation of the invention, $m=\sqrt{84} \approx 9$.

After training the Random Forest model, in order to identify the class labels of the flying targets, we conduct extracting features of the flying targets, and traversing them through each decision tree of the Random Forest.

Each decision tree will give a vote for a class label with the input data are 84-dimensional vectors.

Aggregating the vote on each decision tree, we finalize the class label of flying target based on majority voting. Class label which received the most votes is the class label of the flying target.

In case there are class labels which received the same number of votes, we choose one label randomly.

What is claimed is:

1. Method of automatically determining identification of a flying target by features of motion comprising longitude, latitude, speed, heading time, and 3/A code, comprising the following steps:

Step 1: Features extraction: constructing a features space, wherein the features extraction includes:

Discretizing the longitude and latitude information by constructing a longitude—latitude grid, then mapping the flying target's longitude and latitude to indexes by replacing them with cell indexes where the flying target locates;

Extracting flight path information of the flying target:
From a list of all available flight paths of a country in which the method is applied, supplementing the information of the flight path crossing each cell in the discretized longitude—latitude grid, determining the flight path of the flying target as a chain of cells where the longitude and latitude of the flying target belong to, encoding flight path format in numeric format by binary method;

Converting a time format from hour/minute/second format to a day/night one, in which, day is assigned for a time range from 6 am to 6 pm, and night is assigned for the time range from 6 pm to 6 am, Day value is then encoded as 1, while night value is encoded as 0;

Applying directly the remaining information comprising heading, speed, and 3/A code as features in the features space;

Step 2: Voting for identification, comprising Training the features space which are n-dimensional vectors from step 1 with a set of decision trees;

Traversing the features extracted from step 1 through those decision trees of a Random Forest, each decision tree will give a vote for a class label, the most voted label will be chosen as the class label of the flying target.

2. The method of automatically determining identification of the flying target by features of motion, time, and 3/A code according to claim 1, further comprising, at the features extraction step, wherein longitude—latitude grid is split into cells, and a process of encoding flight path inn' dimensions of the feature space (where n' is the number of flight paths of the country in which the method is applied).

3. The method of automatically determining identification of the flying target by features of motion, time, and 3/A code, according to claim 1, wherein the Random Forest is built according to the following:

Generating subsets from original training dataset comprising a list of flying target identifications with corresponding motion, time, and 3/A code information, this dataset is collected beforehand in order to be used as initial data to train Random Forest model by a sampling with replacement technique allowing the data to be repeated in the subset;

Training those subsets with decision trees; and

Calculating average prediction result for each new subset.

4. The method of automatically determining identification of the flying target by features of motion, time, and 3/A code, according to claim 1, wherein when the decision trees votes, in the case there are class labels which received the same number of votes, one label is chosen randomly.

* * * * *